(12) United States Patent
Wang et al.

(10) Patent No.: US 8,576,278 B2
(45) Date of Patent: Nov. 5, 2013

(54) SYSTEM FOR MONITORING DYNAMIC STABILITY OF MICRO MACHINE PROCESS AND METHOD THEREOF

(75) Inventors: Shih-Ming Wang, Chung Li (TW); Chia-You Chung, Chung Li (TW); Chih-Chun Lin, Chung Li (TW)

(73) Assignee: Chung Yuan Christian University, Tao-Yuan (TW)

( * ) Notice: Subject to any disclaimer, the term of this patent is extended or adjusted under 35 U.S.C. 154(b) by 341 days.

(21) Appl. No.: 12/687,826

(22) Filed: Jan. 14, 2010

(65) Prior Publication Data
US 2011/0228077 A1 Sep. 22, 2011

(30) Foreign Application Priority Data

Jan. 14, 2009 (TW) ................................ 98101226 A (51) Int. Cl.
*H04N 7/18* (2006.01)
(52) U.S. Cl.
USPC .......................................... 348/86; 382/152

(58) Field of Classification Search
None
See application file for complete search history.

(56) References Cited

U.S. PATENT DOCUMENTS

| | | | |
|---|---|---|---|
| 6,381,365 B2 * | 4/2002 | Murakawa | 382/190 |
| 6,606,528 B1 * | 8/2003 | Hagmeier et al. | 700/98 |
| 7,933,679 B1 * | 4/2011 | Kulkarni et al. | 700/173 |
| 2008/0225286 A1 * | 9/2008 | Shibata et al. | 356/300 |
| 2008/0240541 A1 * | 10/2008 | Chiou et al. | 382/141 |

* cited by examiner

*Primary Examiner* — Christopher S Kelley
*Assistant Examiner* — Christopher Findley
(74) *Attorney, Agent, or Firm* — WPAT, PC; Justin King (57) ABSTRACT

The present invention discloses a system for monitoring dynamic stability of micro machine is provided in this invention, wherein an image-capturing device and an analytic device are included. The image-capturing device captures an image on a surface of a work piece milled by the micro machine. The analytic device comprises an image input interface, means for gray-scaling an image, means for analyzing abnormal gray-scaled value of the gray-scaled image, and means for analyzing numbers of veins of the gray-scaled image. This invention also provides a method for monitoring dynamic stability of micro machine.

20 Claims, 6 Drawing Sheets

SYSTEM FOR MONITORING DYNAMIC STABILITY OF MICRO MACHINE PROCESS AND METHOD THEREOF

BACKGROUND OF THE INVENTION

1. Field of the Invention

The present invention is generally related to a monitoring micro machine system and method, and more particularly to a system for monitoring dynamic stability of a micro machine and method thereof.

2. Description of the Prior Art

With technological product worldwide moving to compact, ultra precision development, it is an increasing trend for the requirement of micro precision manufacture for 3C industry, optoelectronic device, semiconductor manufactures, communication industry, precision mould manufactures, and precision component manufactures.

Miniature manufacturing technology nowadays utilizes micro electronic device manufacturing technology that develops micro electromechanical systems (MEMS). Nevertheless, the MEMS technology shall be suitable for processing 2-2.5D geometrical outline, and relative processing precision (size tolerance/workpiece size) of that is about $10^{-1} \sim 10^{-2}$ mm. For relative precision close to or larger than $10^{-3} \sim 10^{-5}$ mm of larger processing mould, as well as complicated 3D miniature product, there is no solution or technology to meet such a requirement. Another bottleneck is that MEMS technology can not be applied to metal material or other diverse material. On the other hand, although nano-scale processing usually utilizes STM or AFM, they are low cycle time and immature. Hence, although MEMS technology (such as LIGA technology) developed tolerable application, miniature industrial component manufacturing method still using traditional mechanical processing, moulding, EDM, or LASER processing. Therefore, development of Non-MEMS miniature processing technology is a mainstream in worldwide study and research, which utilizes traditional mechanical processing, by means of miniature design and equipment, with meso-/micro-scale processing technology to approach precision processing. After such this field being continuously and extensively developed, it may exceed limit of MEMS technology, and applied to processing diverse metal material to extend to various industrial applications.

There are many savants and researchers worldwide devote themselves to study of precision research now. However, due to miniature precision processing, equipment for precision processing still needs considerable improvement in precision. Besides equipment design should keep in definite range, differing to medium or large size processing, requirement of processing precision is elevated while equipment size is minimized, even under the same relative processing precision (size tolerance/workpiece size) requirement. Therefore, besides precision to processing equipment per se, factors of micro tool deflection and vibration in milling are issues for promoting micro processing precision. Profile errors, surface roughness, and veins distributions on a workpiece should be monitored or detected to the micro tool deflection and vibration, such that optimized processing parameters (to obtain minimum deflection and vibration as well as processing efficient) can refer to and improvement can be approved. Further, after processing, workpiece surface roughness and veins distribution should also be monitored or detected to determine milling dynamic stability, and feedback for better processing parameters.

Conventional milling dynamic anomaly detection adopts force-sensing device to measure abnormal milling, or determination of surface roughness to check if processing is acceptable. The latter one has contact type and non-contact type. To monitoring dynamic abnormal milling of a micro machine, it is very difficulty to use force-sensing device due to tiny milling force; contact type of measuring surface roughness will damage to surface of the micro tool easily. Therefore, a non-contact type image detection for analyzing surface features is needed to figure milling stability. However, nowadays algorithms can not obtain a useful result to micro machine, so a new algorithm is necessary to meet requirement.

SUMMARY OF THE INVENTION

Present invention provides a system and method for determining stability of a micro tool dynamic milling by using image detection, analysis the image, and calculating real feed/tooth of the micro tool and gray-level features.

the present invention discloses a system for monitoring dynamic stability of a micro machine which comprises an image-capturing device for capturing images of a micro tool of the micro machine processing on a workpiece, and an analysis device. The analysis device comprises an image input interface for receiving the images captured by said image-capturing device, means for transforming the images into gray-level to gray-levelized images, means for analyzing abnormal gray-level ratio of the gray-levelized images, and means for calculating vein quantity of the gray-levelized images.

The present invention also discloses a method for monitoring process stability of a micro machine which comprises step of calculating a ratio of milling deeper area to a workpiece surface, and calculating vein numbers on the workpiece processed by a micro tool of the micro machine.

The present invention also discloses a method for detecting dynamic stability of a micro machine, which comprises steps of capturing an image of a workpiece surface with milled vein, wherein the workpiece surface is milled by a micro tool of the micro machine; transforming the image into gray-level; exchanging hues of the gray-level image; calculating a ratio of abnormal gray-level to the gray-level image; calculating vein numbers of the gray-level image; and analyzing feed/tooth value of the micro machine.

DESCRIPTION OF THE PREFERRED EMBODIMENTS

What is probed into the invention is a system and method for monitoring dynamic stability of a micro machine. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention.

In this invention, a system and method for monitoring dynamic milling stability of a micro tool dynamic by using analysis images, and calculating real feed/tooth of the micro tool and gray-level features. Because image analysis is performed by algorithm, a low cost system and method can be provided. Followed up cost will not be incurred with upgrading new algorithm.

In this invention, a system for monitoring dynamic stability of a micro machine is disclosed, which comprises an image-capturing device for capturing images of a micro tool of the micro machine processing on a workpiece, and an analysis device. The analysis device comprises an image input interface for receiving the images captured by said image-capturing device, means for transforming the images into gray-level to gray-levelized images, means for analyzing abnormal gray-level ratio of the gray-levelized images, and means for calculating vein quantity of the gray-levelized images.

The means for analyzing abnormal gray-level ratio of the gray-levelized images comprises steps of hues-exchanging unit for exchanging dark and bright hues of the gray-levelized images into exchanged gray-levelized images; image-carving unit for capturing bright areas of the exchanged gray-levelized images; calculating abnormal gray-level exponential unit for calculating exponential of abnormal gray-level to all pixels of the exchanged gray-levelized images; and calculating abnormal gray-level ratio unit for calculating ratio of abnormal gray-level to pixels of the exchanged gray-levelized images. The image-carving unit defines an image threshold value, in which the abnormal gray-level is defined as gray-levelized image larger than the image threshold value. The image threshold value is averaged of largest gray-level and averaged gray-level of the gray-levelized image.

That means for calculating vein quantity of the gray-levelized images comprises a Fourier transformation unit for transforming the gray-levelized image into frequency domain, a main frequency analysis unit for calculating vein number from the gray-levelized image of frequency domain, and calculating real milling feed/tooth ratio from the vein number. The Fourier transformation unit performs fast Fourier transformation. The image-capturing device is a CCD or a CMOS digital camera.

In this invention, a method for monitoring process stability of a micro machine also is disclosed, which comprises step of calculating a ratio of milling deeper area to a workpiece surface, and calculating vein numbers on the workpiece processed by a micro tool of the micro machine. wherein said step of calculating vein numbers on the workpiece calculates milling feed/tooth ratio of the micro machine.

In this invention, a method for detecting dynamic stability of a micro machine is disclosed, which comprises steps of capturing an image of a workpiece surface with milled vein, wherein the workpiece surface is milled by a micro tool of the micro machine; transforming the image into gray-level; exchanging hues of the gray-level image; calculating a ratio of abnormal gray-level to the gray-level image; calculating vein numbers of the gray-level image; and analyzing feed/tooth value of the micro machine.

That step of calculating a ratio of abnormal gray-level to the gray-level image comprises steps of calculating abnormal gray-level exponential, and calculating abnormal gray-level ratio. That step of exchanging hues exchange dark and bright hues of the gray-level image.

The method for detecting dynamic stability of a micro machine further comprises an image-carving step before said step of calculating a ratio of abnormal gray-level to the gray-level image. That step of image-carving calculates a threshold value, in which the abnormal gray-level is defined as the gray-level images larger than the threshold value. That threshold value is averaged of largest gray-level and averaged gray-level of the gray-level image. That step of calculating abnormal gray-level exponential calculates exponentials of abnormal gray-level to all pixels in the gray-level image. That step of calculating the ratio of abnormal gray-level calculates abnormal gray-level to image pixels in the gray-level image.

That step of calculating vein numbers of the gray-level image comprises steps of performing Fourier transformation to the gray-level image to gray-level frequency, and calculating the gray-level frequency to obtain vein numbers. The Fourier transformation is fast Fourier transformation. The image of the workpiece surface with milled vein is captured by using an image-capturing device. The image-capturing device is a CCD or CMOS digital camera.

In this invention, the micro machine can be a toggle machine, which can be referred to a Taiwan patent application with application number 095117612, title is "TOGGLE-TYPE POSITIONING PLATFORM AND TOGGLE-TYPE MACHINE CENTER" invented by Shih-Ming Wang and Chih-Peng Yang and applied by CYCU.

The following will provide preferred embodiments with drawings in according to this invention.

The workpiece surface image is affected by workpiece surface roughness, material, and brightness, and gray-level distribution of gray-level image is also affected. When dynamic milling stability is abnormal, workpiece surface veins will show abnormal fluctuation, and such abnormal veins will appeared darker (lower gray-level) in the gray-level image. In this invention, for monitoring abnormal dynamic milling, workpiece surface veins image is captured at fixed powered light source, in order to avoid light affecting gray-level of image.

Figure 1:
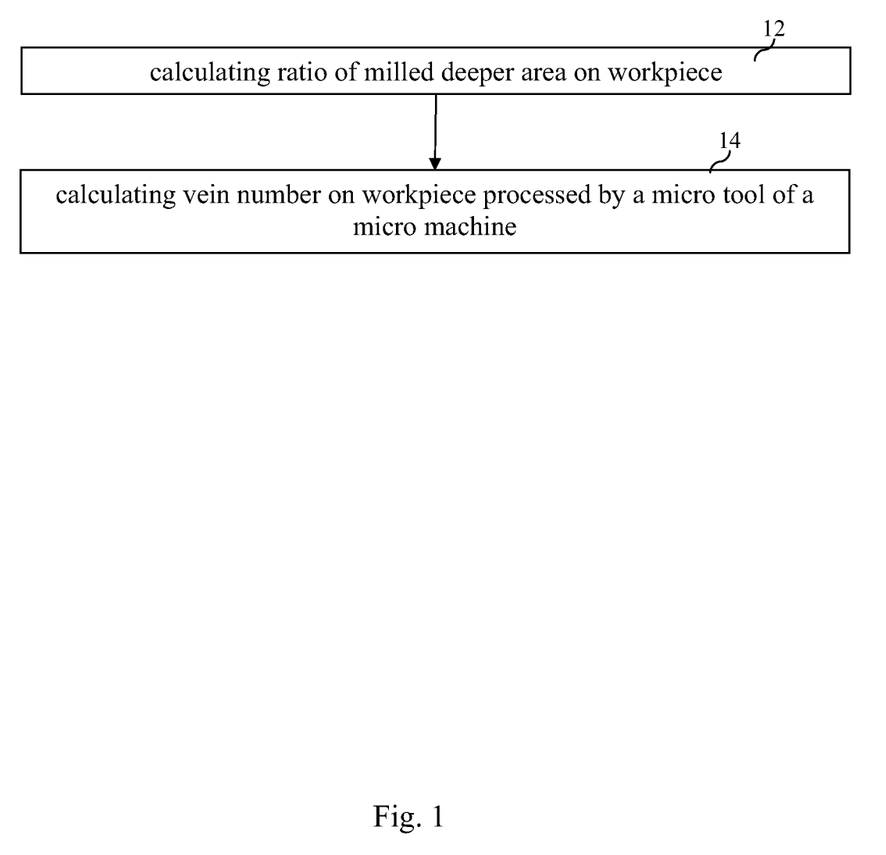
FIG. 1 shows one preferred embodiment flow diagram of a method for monitoring dynamic stability of a micro machine in accordance with present invention.

As shown in FIG. 1, a method for monitoring milling stability of a micro machine is disclosed. This method has two steps. The first step is to calculate a ratio of area milled deeper on a workpiece surface (step 14). The second step is to calculate vein number or quantity on the workpiece surface processed by the micro machine. The implementation of these two steps can be reversed or simultaneous. Object of calculating vein number is to calculate feed/tooth ratio of the micro machine.

Figure 2:
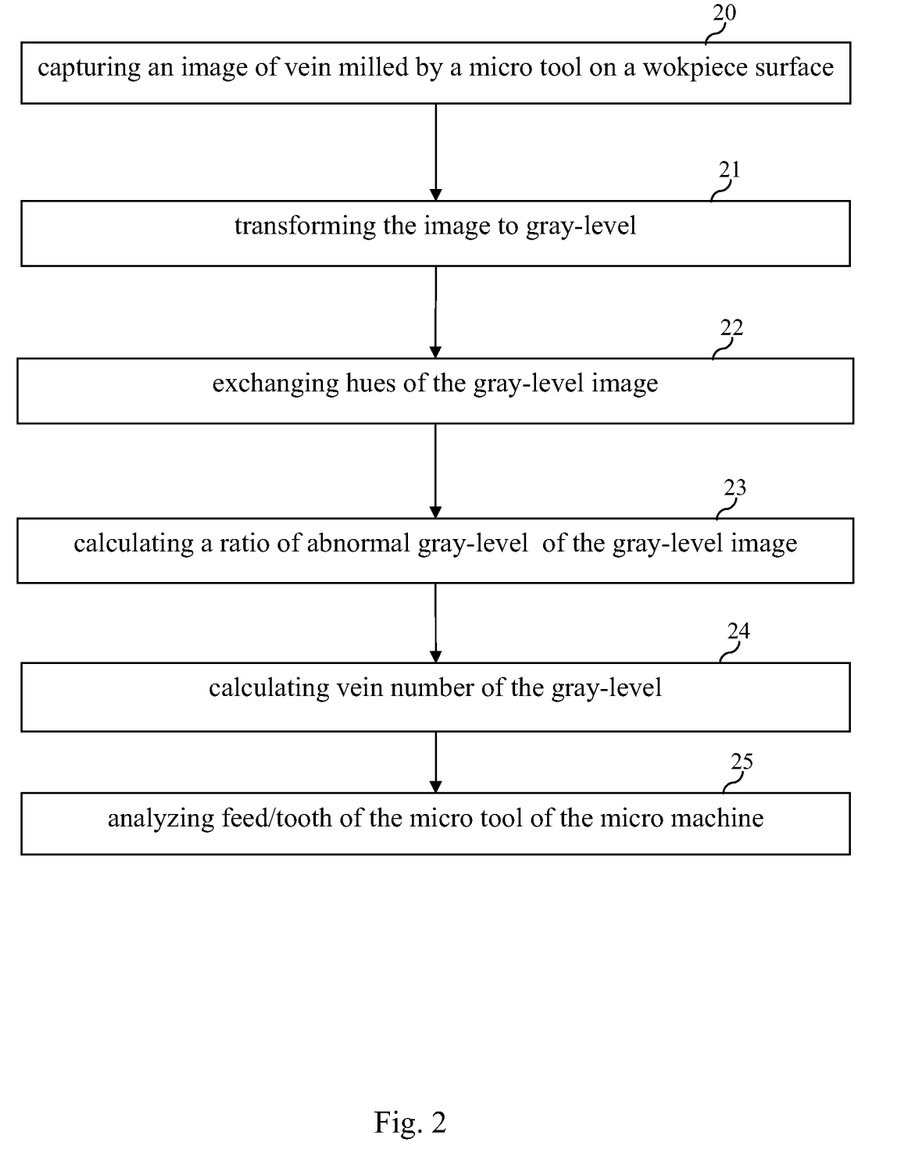
FIG. 2 shows another embodiment flow diagram of a method for detecting dynamic stability of a micro machine in accordance with present invention.

This invention also provides a method for detecting dynamic stability of a micro machine. As shown in FIG. 2, a flow chart illustrates each step of this method. First, an image of milled or drilled vein on a workpiece surface is captured (step 20), wherein the workpiece surface is processed by a micro machine. Then, the image is transformed into a gray-level image (step 21). Next, hues of bright and dark are exchanged to the gray-level image (step 22), wherein this step is needed in image analysis. Then, an image-carving step is performed, which calculates a threshold value, and defines abnormal gray-level as larger than the threshold value, wherein threshold value is averaged of largest gray-level and averages gray-level of the image. Next, a ratio of abnormal gray-level to the image is calculated (step 23), wherein calculation of abnormal gray-level exponential and abnormal gray-level ratio is included. The step of calculating abnormal gray-level exponential calculates exponential of abnormal gray-level in all pixel of the image, and the step of calculating abnormal gray-level ratio calculate ratio of abnormal gray-level to image pixel. Then, vein number or quantity of the gray-level image is calculated (step 24), wherein Fourier transformation is performed to the gray-level image into gray-level frequency, and gray-level frequency is calculated to obtain vein number. The Fourier transformation is fast Fourier transformation. Then, feed/tooth ratio of the micro tool of the micro machine is calculated (step 25). Dynamic stability of the micro machine can be monitored by using the abnormal gray-level ratio of the image and feed/tooth ratio of the micro tool. The vein image on the workpiece surface is captured by an image-capturing device which can be CCD or CMOS digital camera.

Figure 3:
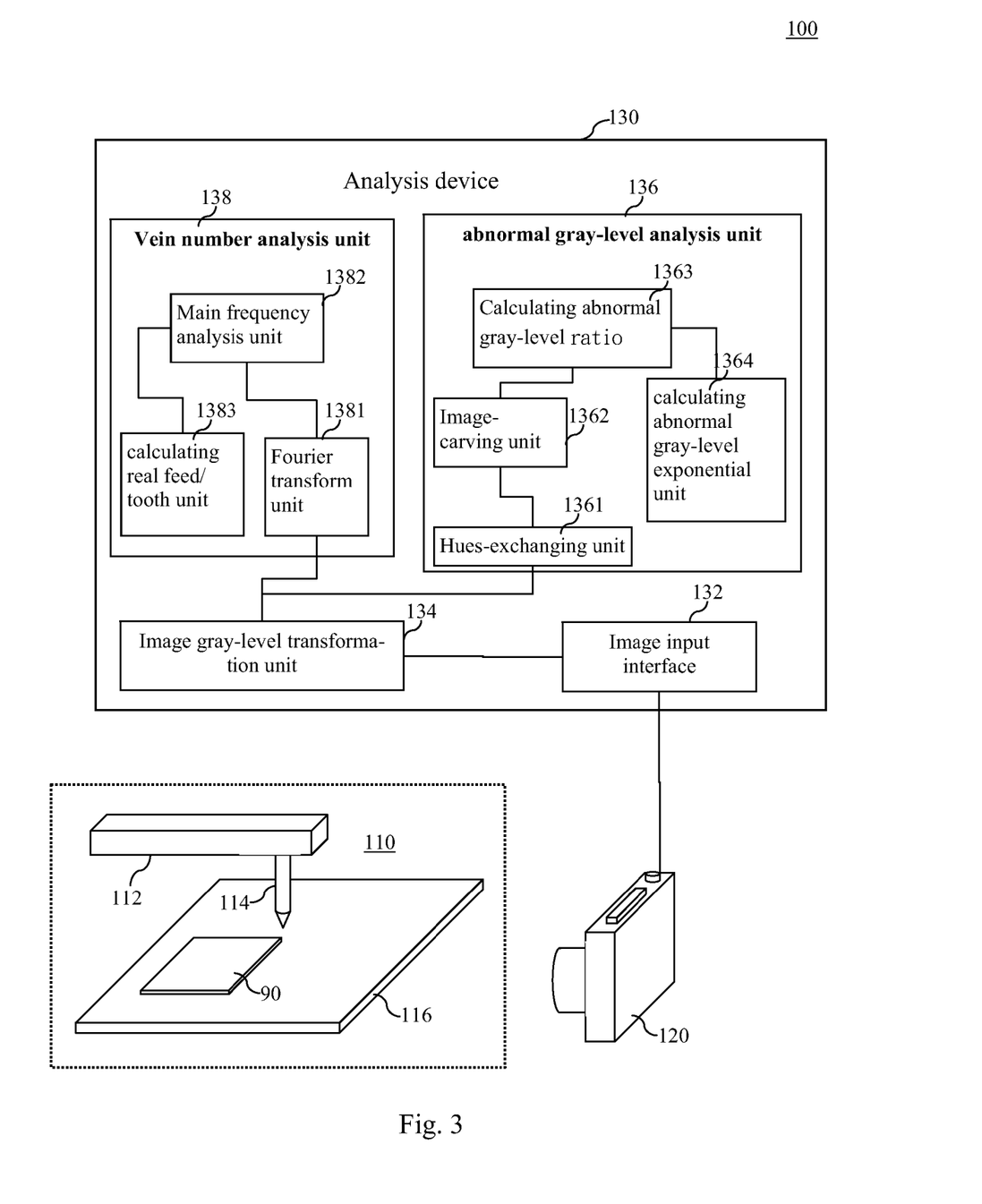
FIG. 3 schematic diagram illustrating a system for detecting dynamic stability of a micro machine in accordance with present invention.

In accordance with method described above, this invention also provides a system for monitoring dynamic stability of a micro machine. As shown in FIG. 3, a system for monitoring dynamic stability of a micro machine is shown, which comprises an image-capturing device 120, and an analysis device. The image-capturing device 120 capturing surface image of a workpiece 90 processed or milled by a micro tool 114 of a micro machine 110, wherein the micro tool 114 is equipped on a robot arm 112 and the workpiece 90 is mount on a platform 116.

The image-capturing device 120 can be a CCD or CMOS digital camera. CCD sensor and CMOS sensor have differences, such as sensitivity, cost, resolution, noise, and power consumption, on performance or applications. CCD sensor has better on sensitivity, resolution, noise control than CMOS sensor, but CMOS sensor has lower cost and better power consumption than CCD sensor. However, with the progress of technology, differences between both CCD and CMOS cameras are decreased little by little. CCD sensor has improved power consumption issue and CMOS sensor improves resolution and sensitivity.

The analysis device 130 includes an image input interface 132, an image gray-level transformation unit 134, an abnormal gray-level analysis unit 136, and a vein quantity analysis unit 138. The image captured by the image-capturing device 120 can be forward to image analysis device 130 via memory card, USB, IEEE 1394, RS 232, printer port, wireless connection, or other particular specification. Specifications of memory card can be CF, SD/MMC, MS, or Smart Card. In this embodiment, image input interface 132 uses USB to transfer data.

The image gray-level transformation unit 134, also known as image gray-levelized unit 134, is a means to transform images captured by the image-capturing device 120 into gray-level, and then output to the abnormal gray-level analysis unit 136 and vein number analysis unit 138. Method or means for transforming images into gray-level can be any kind of conventional one. Gray-level or gray-scale of a pixel is affected by brightness of the pixel, and two components constitute brightness function f(x, y): (1) illumination, is received light in a unit area; and (2) coefficient of reflectance, with value from 0 to 1 real number, and high reflectance when this value close to 1. relationship between illumination i(x, y), reflectance of coefficient r(x, y) and f(x, y) is:

$$f(x,y)=i(x,y)r(x,y)$$

wherein $$0<i(x, y)<\infty, 0<r(x, y)<1$$

In order to make computer calculate, brightness function must be digitalized. Binary image function f(x, y) should be a finite discrete quantity in space and to be digital image of gray-level G. Digital image can be seemed as a big matrix, in which x and y are integers larger than zero with its range depending on size of an image, and brightness between 0 (dark) to 255 (bright). Digital image can be seems as large array, in which each point has a quantized brightness, and these points are pixels. Gray-level image and illumination i(x, y), reflectance of coefficient r(x, y) has relationship as followed:

$$G(x,y)=i(x,y)r(x,y)$$

wherein $$0 \leq G(x, y) \leq 255$$

The abnormal gray-level analysis unit 136, that is a means for analyzing abnormal gray-level, calculates abnormal gray-level ratio and abnormal gray-level exponential, which includes hues-exchanging unit 1361, image-carving unit 1362, calculating abnormal gray-level unit 1363, and calculating abnormal gray-level exponential unit 1364. The hues needs to be exchanged from dark to bright and vice versa on the gray-level image of workpiece surface vein due to requirement of following procedures, and by using hue-exchanging unit 1361 to process the gray-level image, abnormal vein will appear brighter (larger gray-level). The image-carving unit 1362 preserves gray-level image larger than a predetermined threshold gray-level value, and other gray-levels can be treated as stable that should not be taken into consideration. The threshold value T is defined:

$$T=(Gmax+Gaverage)/2, 0 \leq T \leq 255$$

wherein Gmax is the largest gray-level in the image and Gaverage is averaged value of all gray-level of the image.

Gray-level larger than the threshold value is defined as abnormal gray-level. And then, carved image is forward to the calculating abnormal gray-level ratio unit 1363 and calculating abnormal gray-level exponential unit 1364 to calculate abnormal gray-level ratio and abnormal gray-level exponential. The calculating abnormal gray-level ratio unit 1363 is a summation of abnormal gray-level subtracting threshold and then divided by pixel number. The expression is:

$$\text{abnormal gray-level exponential} = \frac{\text{sums(abnormal\_graylevel - threshold)}}{\text{pixel\_number}}$$

The calculating abnormal gray-level exponential unit 1364 is percentage of abnormal gray-level number divided by pixel number. The expression is:

$$\text{abnormal\_graylevel\_ratio} = \frac{\text{abnormal\_graylevel\_number}}{\text{pixel\_number}} \times 100\%$$

The vein analysis unit 138, that is a means for analyzing vein number, includes fourier transformation unit 1382, main frequency analysis unit 1382, and calculating real feed/tooth ratio unit 1383. the Fourier transformation unit 1381 is to transform gray-level image into frequency domain. Because fourier transformation is a frequency analysis tool and has full frequency characteristic, all stable frequency can be observed. This invention uses fast Fourier transformation to obtain abnormal frequency of the gray-level image of milled or drilled workpiece.

The discrete Fourier transform (DFT) is an important base to image processing, for capturing or processing specific image frequency. In two dimensions, DFT has matrix input and another matrix output. If an original matrix is f(x, y) and output matrix is F(u, v), and f(x, y) is F(u, v) Fourier transformation.

Let f(x, y) be an M×N image, two-dimensional DFT f represented by F(u, v). Pixel gray-level of a point (x, y) on the image can be transformed into image frequency by two dimensional DFT, wherein u and v are frequency variables, matrix M×N is called frequency rectangle, with the same size to input image.

$$F(u, v) = \sum_{x=0}^{M-1} \sum_{y=0}^{N-1} f(x, y) \cdot \exp\left[-2\pi i\left(\frac{xu}{M} + \frac{yv}{N}\right)\right]$$

wherein u=0, 1, 2, ..., M−1 and v=0, 1, 2, ..., N−1
Reversed Fourier transformation is;

$$f(x, y) = \frac{1}{MN} \sum_{x=0}^{M-1} \sum_{y=0}^{N-1} F(u, v) \cdot \exp\left[2\pi i\left(\frac{xu}{M} + \frac{yv}{N}\right)\right]$$

wherein u=0, 1, 2, ..., M−1 and v=0, 1, 2, ..., N−1
The gray-level f(x, y) of image is real number, and will be a complex number after Fourier transformation. Calculation of spectrum, i.e. F(u, v), is:

$$F(u,v) = R(u,v) + j \cdot I(u,v)$$

wherein R(u, v) and I(u, v) are real part and imaginary part of F(u, v).
Transformed phase angle is:

$$\phi(u, v) = \tan^{-1}\left[\frac{I(u, v)}{R(u, v)}\right]$$

Power spectrum of f(x, y) is defined as square of size, as below:

$$P(u,v) = |F(u,v)|^2 = R^2(u,v) + I^2(u,v)$$

In spectrum origin, the transformed F(0,0) is DC coefficient of Fourier transformation, with u=v=0. All terms summation of the original matrix is:

$$F(0, 0) = \sum_{x=0}^{M-1} \sum_{y=0}^{N-1} f(x, y)\exp(0) = \sum_{x=0}^{M-1} \sum_{y=0}^{N-1} f(x, y)$$

The fast Fourier transformation (FFT) is one DFT and can use fast algorithm to calculate. Using FFT to calculate DFT can save a lot of time, wherein FFT is a recursion type to calculate. The original matrix is divided into two parts and performed FFT respectively, and results are combined. Another DFT type is defined as:

$$X(k) = \sum_{n=0}^{N-1} x(n) W^{nk}, k = 0, 1, \ldots, N-1$$

wherein $W = e^{-j2\pi/N}$
Because base number is 2, DFT can be separate into two terms:

$$X(k) = \sum_{n=0}^{N/2-1} x(n) W^{nk} + \sum_{n=N/2}^{N-1} x(n) W^{nk}$$

The second term after variable transformation n=n+N/2

$$X(k) = \sum_{n=0}^{N/2-1} x(n) W^{nk} + W^{kN/2} \sum_{n=0}^{N/2-1} x(n + N/2) W^{nk}$$

By using natural exponential function, $$W^{kN/2} = e^{-jk\pi} = (-1)^k$$

X(k) can be simplified as:

$$X(k) = \sum_{n=0}^{N/2-1} \left[x(n) + x\left(n + \frac{N}{2}\right)\right] W^{nk}, \text{ for } k \text{ even}$$

for k even $$X(k) = \sum_{n=0}^{N/2-1} \left[x(n) - x\left(n + \frac{N}{2}\right)\right] W^{nk}, \text{ for } k \text{ odd}$$

for k odd
k=2k when k even, k=2k+1 when k odd, $$X(2k) = \sum_{n=0}^{N/2-1} A(n) W^{2nk}, \text{ for } k = 0, 1, \ldots \frac{N}{2} - 1$$

$$A(n) = x(n) + x\left(n + \frac{N}{2}\right)$$

$$X(2k+1) = \sum_{n=0}^{N/2-1} B(n) W^n W^{2nk}, \text{ for } k = 0, 1, \ldots \frac{N}{2} - 1$$

$$B(n) = x(n) - x\left(n + \frac{N}{2}\right)$$

The four expressions above show even terms of time sequence x(n) by N points DFT, like N/2 points DFT of A(n); odd terms of time sequence x(n) by N points DFT, like N/2 points DFT of B(n), wherein Wn is twiddle factor. For the same reason, N/2 points DFT can be performed to N/4 points DFT, and repeated to N/2i=2.

N points DFT multiplication complexity is O(N2), FFT lowers N, and by using natural exponential $W^{kN/2} = e^{-jk\pi} = (-1)^k$ to decrease multiplicity complexity significantly.

When vector length is order or 2, FFT can provide maximum efficiency, so FFT is a basis and importance of image processing. It can transform original matrix from spatial domain into frequency domain Fourier spectrum.

Figure 4:
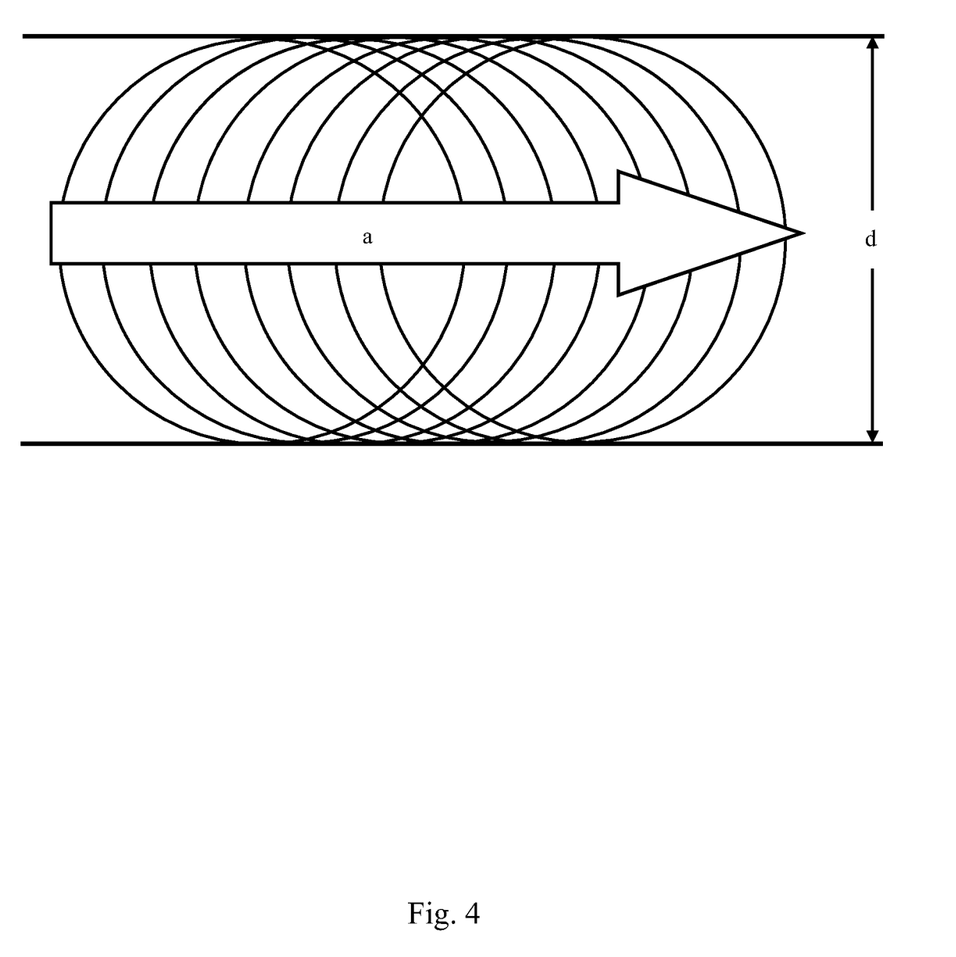
FIG. 4 shows a schematic diagram illustrating a micro tool veins on a workpiece and moving direction.

The main frequency analysis unit 1382 calculates vein number of the images resulted from FFT frequency domain, wherein vein number is processed, drilled or milled, by the micro tool 114 on the workpiece 90. Then, a calculating real feed/tooth unit 1383 calculates real feed/tooth ratio by visible vein number in the images. This measured value compared to theoretical value can tell dynamic stability of the micro machine. When milling is abnormal, vein density of milled surface on workpiece surface will be affected. Please refer to FIG. 4, wherein circles represent vein processed by the micro tool, a represents milling direction of the micro tool, and d represents diameter of the micro tool.

Figure 5:
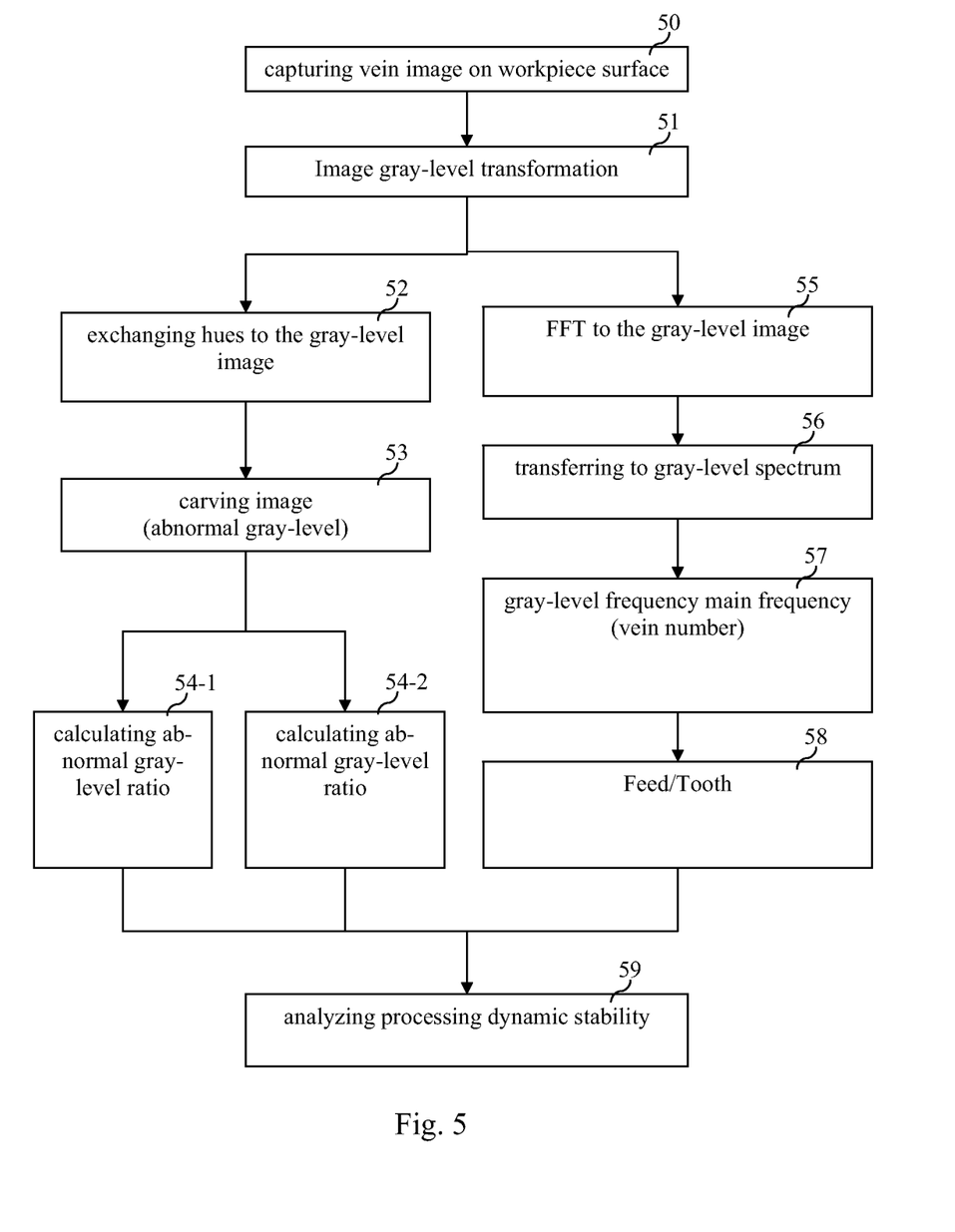
FIG. 5 shows one embodiment flow diagram of detecting abnormal milling of a micro machine in accordance with present invention.

In according to system shown in FIG. 3, flow chart of detecting abnormal milling method is shown in FIG. 5. First, vein on the workpiece 90 surface is captured (step 50), in which an image-capturing device 120 is used to capture workpiece 90 surface. Then, the capture image, through image input interface 132, is transformed to gray-level by image gray-level transformation unit 134 (step 51). The gray-level image is performed hue-exchanging (step 52) in the hue-exchanging unit 1361. Next, the image is carved in the image-carving unit 1362, wherein a threshold value is calculated first, and abnormal gray-level is defined as over this threshold value. Then, abnormal gray-level ratio is calculated in the calculating abnormal gray-level ratio unit 1363 (step 54-1), and abnormal gray-level exponential is calculated in the calculating abnormal gray-level exponential unit 1364 (step 54-2).

In addition, in Fourier transformation unit 1382, gray-level pixel is performed FFT (step 55). Transformed result would be frequency domain of gray-level image (step 56). Then, in the main frequency analysis unit 1382 main frequency of gray-level spectrum is analyzed (step 57), wherein this step is to calculate vein number from frequency domain. Next, real feed/tooth ratio is calculated in the calculating real fed/tooth unit 1383. And, dynamic stability is analyzed (step 59).

Figure 6:
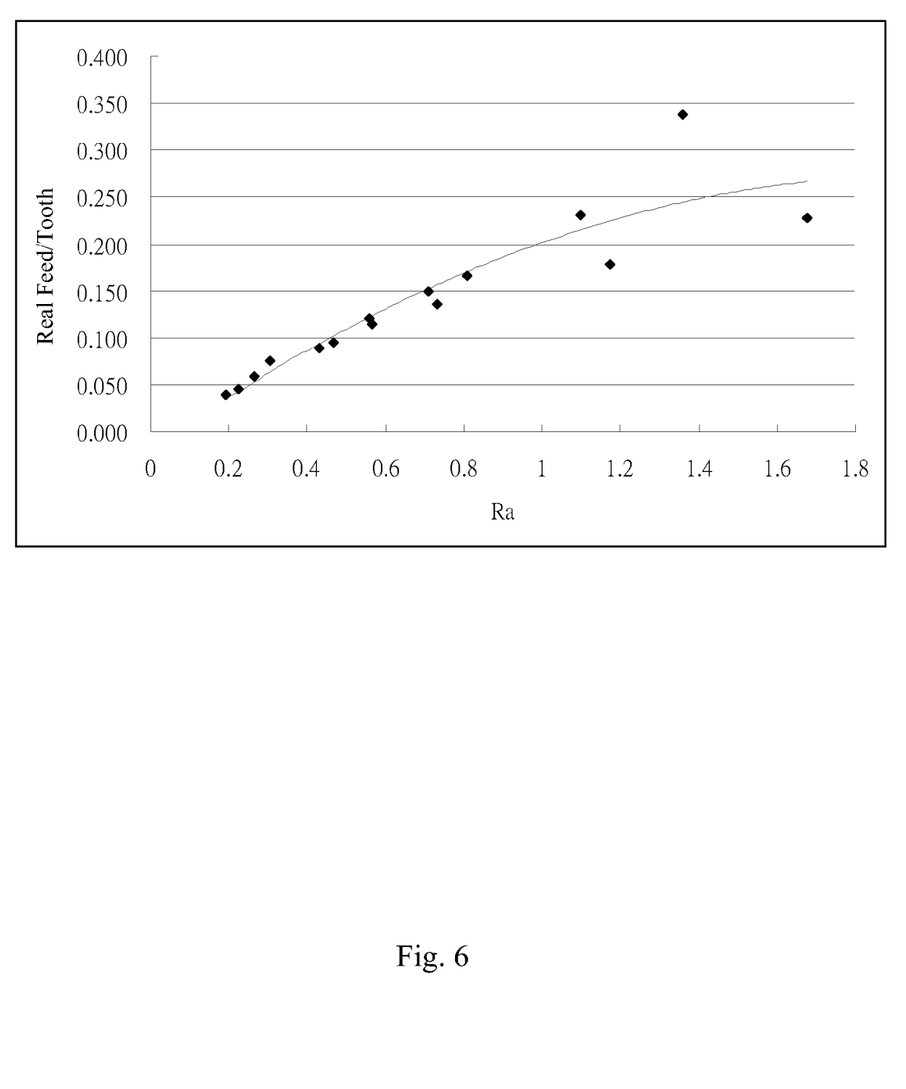
FIG. 6 illustrates relationship between real feed/tooth and surface roughness

Relationship between real feed/tooth and surface roughness can be shown in FIG. 6. Workpiece surface roughness will be worse with real larger feed/tooth in FIG. 6, and relationship is a curve.

When processing stable of the micro tool is abnormal, efficient measure or detect tool is void in prior art. In this invention, micro tool feed/tooth can be obtained by using gray-level image of workpiece surface vein, calculating main frequency of gray-level frequency, and gray-level characteristic distribution coefficient.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A system for monitoring dynamic stability of a micro machine, comprising:
    an image-capturing device for capturing images of a micro tool of the micro machine processing on a workpiece; and
    an analysis device, comprising:
        an image input interface for receiving the images captured by said image-capturing device;
        means for transforming the images into gray-level to gray-levelized images;
        means for analyzing abnormal gray-level ratio of the gray-levelized images, comprising:
            hues exchanging unit for exchanging dark and bright hues of the gray-levelized images into exchanged gray-levelized images;
            image-carving unit for capturing bright areas of the exchange gray-levelized images;
            calculating abnormal gray-level exponential unit for calculating exponential of abnormal gray-level to all pixels of the exchanged ray-levelized images; and
            calculating abnormal gray-level ratio unit for calculating ratio of abnormal gray-level to pixels of the exchanged gray-levelized images; and
        means for calculating vein quantity of the gray-levelized images.

2. The system for monitoring dynamic stability of a micro machine according to claim 1, wherein said image-carving unit defines an image threshold value, in which the abnormal gray-level is defined as gray-levelized image larger than the image threshold value.

3. The system for monitoring dynamic stability of a micro machine according to claim 2, wherein said image threshold value is averaged of largest gray-level and averaged gray-level of the gray-levelized image.

4. The system for monitoring dynamic stability of a micro machine according to claim 1, wherein means for calculating vein quantity of the gray-levelized images comprises:
    a Fourier transformation unit for transforming the gray-levelized image into frequency domain;
    a main frequency analysis unit for calculating vein number from the gray-levelized image of frequency domain; and
    calculating real milling feed/tooth ratio ratio from the vein number.

5. The system for monitoring dynamic stability of a micro machine according to claim 4, wherein Fourier transformation unit performs fast Fourier transformation.

6. The system for monitoring dynamic stability of a micro machine according to claim 4, wherein said image-capturing device is a CCD or a CMOS digital camera.

7. The system for monitoring dynamic stability of a micro machine according to claim 1, further comprising:
    means for calculating a ratio of milling deeper area to a workpiece surface; and
    means for calculating vein numbers on the workpiece processed by a micro tool of the micro machine.

8. The system for monitoring dynamic stability of a micro machine according to claim 7, wherein said means for calculating vein numbers on the workpiece calculates milling feed/tooth ratio of the micro machine.

9. A method for detecting dynamic stability of a micro machine, comprising:
    capturing an image of a workpiece surface with milled vein, wherein the wrokpiece surface is milled by a micro tool of the micro machine;
    transforming the image into gray-level;
    exchanging hues of the gray-level image;
    calculating a ratio of abnormal gray-level to the gray-level image;
    calculating vein numbers of the gray-level image; and
    analyzing feed/tooth value of the micro machine.

10. The method for detecting dynamic stability of a micro machine according to claim 9, wherein said step of calculating a ratio of abnormal gray-level to the gray-level image comprises:
    calculating abnormal gray-level exponential; and
    calculating abnormal gray-level ratio.

11. The method for detecting dynamic stability of a micro machine according to claim 10, wherein said step of exchanging hues exchange dark and bright hues of the gray-level image.

12. The method for detecting dynamic stability of a micro machine according to claim 11, further comprising an image-carving step before said step of calculating a ratio of abnormal gray-level to the gray-level image.

13. The method for detecting dynamic stability of a micro machine according to claim 12, wherein said step of image-carving calculates a threshold value, in which the abnormal gray-level is defined as the gray-level images larger than the threshold value.

14. The method for detecting dynamic stability of a micro machine according to claim 13, wherein said threshold value is averaged of largest gray-level and averaged gray-level of the gray-level image.

15. The method for detecting dynamic stability of a micro machine according to claim 14, wherein said step of calculating abnormal gray-level exponential calculates exponentials of abnormal gray-level to all pixels in the gray-level image.

16. The method for detecting dynamic stability of a micro machine according to claim 14, wherein said step of calculating the ratio of abnormal gray-level calculates abnormal gray-level to image pixels in the gray-level image.

17. The method for detecting dynamic stability of a micro machine according to claim 14, wherein said step of calculating vein numbers of the gray-level image comprises:

performing Fourier transformation to the gray-level image to gray-level frequency; and calculating the gray-level frequency to obtain vein numbers.

18. The method for detecting dynamic stability of a micro machine according to claim 17, wherein the Fourier transformation is fast Fourier transformation.

19. The method for detecting dynamic stability of a micro machine according to claim 9, wherein image of the workpiece surface with milled vein is captured by using an image-capturing device.

20. The method for detecting dynamic stability of a micro machine according to claim 19, wherein said image-capturing device is a CCD or CMOS digital camera.

* * * * *